March 5, 1929.  A. KÖNIG ET AL  1,704,330
FILTERING APPARATUS
Filed Jan. 11, 1927

Inventors:
Alfred König
Gerhard Müller
by Franz Reinhold
Attorney.

Patented Mar. 5, 1929.

1,704,330

UNITED STATES PATENT OFFICE.

ALFRED KÖNIG AND GERHARD MÜLLER, OF BERLIN, GERMANY, ASSIGNORS TO THE FIRM STAATLICHE PORZELLAN MANUFAKTUR, OF BERLIN, GERMANY.

FILTERING APPARATUS.

Application filed January 11, 1927, Serial No. 160,397, and in Germany January 19, 1926.

Our invention relates to improvements in filtering apparatus, and more particularly in filtering apparatus of the type in which a bottom part providing a funnel collecting the filtered material is provided with a set of filtering cups of different diameters each of which is adapted to be placed on the said bottom part. One of the objects of the improvements is to provide a filtering apparatus of this class in which the cups separately placed on the bottom part are in tight engagement therewith, and which can be manufactured at low cost. With this object in view our invention consists in providing the bottom part and all the cups respectively at their top and bottom with plane bearing faces, the dimensions of the said faces being such that the bearing face of any cup of the set placed on the bottom part is in engagement with the bearing face formed on the bottom part. Other objects of the invention will appear from the following description.

Figure 4:
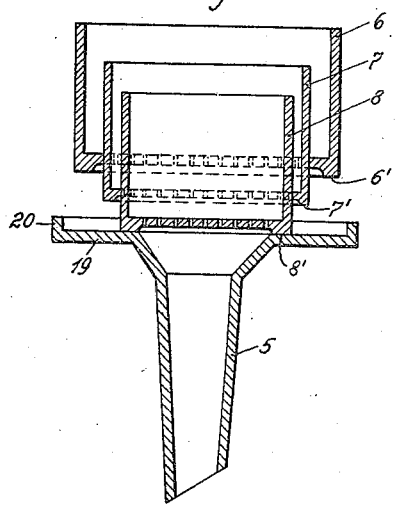
Figure 5:
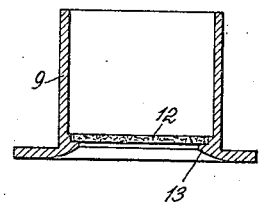

For the purpose of explaining the invention two examples embodying the same have been shown in the accompanying drawing, in which the same reference characters have been used in all the views to indicate corresponding parts. In said drawing, Fig. 1, is a sectional elevation showing the bottom part of the filtering apparatus and the cup placed thereon, Figs. 2 and 3, are similar sectional elevations showing other cups of the set belonging to the filtering apparatus shown in Fig. 1, Fig. 4, is a sectional elevation showing a modification of the bottom part and the cups, and Fig. 5, is a sectional elevational showing a modification of the cups in which the cup is provided with an exchangeable filtering bottom.

Figure 1:
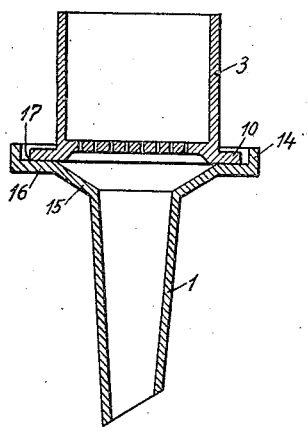
Figure 2:
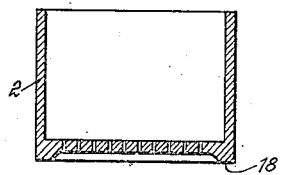
Figure 3:
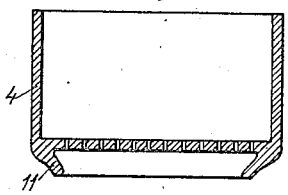

In the example shown in Figs. 1 to 3, our improved filtering apparatus consists of a bottom part comprising a tapering tubular portion 1, a conical portion 15, and a flange 16 having a raised outer rim 14. The said bottom part is adapted to be placed on a suitable vacuum apparatus such as a bottle connected with a suction apparatus or pump, a packing ring being placed between the tapering tubular portion 1 and the neck of the bottle. The horizontal flange 16 is provided at its top side with a plane annular bearing surface 17.

In Figs. 1 to 3 we have shown a set of three cups of different diameters. The diameter of the cup 3 shown in Fig. 1 is equal to or smaller than the inner diameter of the plane annular bearing surface 17, and in order to be able to support the cup 3 on the said bearing surface, it is formed with an outwardly directed horizontal flange 10 formed at its bottom side with a plane bearing surface, the outer diameter of the said flange and bearing surface being smaller or not larger than the outer diameter of the bearing surface 17. In Fig. 2 we have shown a filtering cup 2 in which the outer diameter of the body is larger than the inner diameter of the bearing surface 17 and smaller than the outer diameter of the said bearing surface 17. Thus the bearing surface 18 of the said cup is provided around the margin of the bottom of the cup, a flange or similar extension not being needed. The cup 4 shown in Fig. 3 is larger in diameter than the outer diameter of the bearing surface 17 and the inner diameter of the rim 14, and in order to be able to place the said cup on the bottom member, an inwardly directed flange 11 is provided around the margin of the bottom of the cup, the configuration of the said flange being such that when placing the same on the bearing surface 17 it does not make contact with the inner and upper edge of the rim 14.

By providing the upwardly directed rim 14 the cups are safely supported on the bottom part, and they are not liable to fall from the bottom part by careless handling.

In the figures the cups are shown to be provided with foraminated bottoms. But we wish it to be understood that the said foraminated bottom has been shown merely for the purpose of illustration, and that in some cases a bottom of porous material is provided.

In the example so far described the bearing surface 17 of the bottom part has been made of ordinary size sufficient to produce a tight engagement between the same and the cups, the bearing faces of the cups being adapted to the said bearing surface of the bottom part. In Fig. 4 we have shown a modification in which the cups of the set are provided with bearing surfaces the sizes of which correspond to the diameters of the cups, and in which the bottom part is provided with an enlarged bearing surface the outer diameter of which is equal to or larger than the outer diameter of the largest cup and its bearing surface, and the inner diameter of which is equal to or smaller than the inner diameter of the bearing surface of the smallest cup. In the said figure the bottom part has been indicated by the reference character 5. As shown the said bottom part is provided with a horizontal flange 19 of comparatively large diameter and formed with a raised rim 20. The filtering cups 6, 7 and 8 of the set are different in diameter, and they are formed with bearing faces 6′, 7′ and 8′ the outer diameters of which are equal to the outer diameters of the cups. The outer diameter of the largest bearing surface 6′ is equal to or, preferably, smaller than the outer diameter of the bearing surface of the flange 19, and the inner diameter of the bearing face 8′ of the smallest cup 8 is substantially equal to the upper diameter of the conical part of the bottom part 5. Should it be desired to place a smaller filtering cup 3 on the bottom part 5, the said cup will be provided with an outwardly directed flange such as 10. In a similar way, when using an exceptionally large filtering cup the diameter of which exceeds the inner diameter of the rim 20, a cup of the form shown in Fig. 3 may be used.

In Fig. 5 we have shown a cup 9 which is provided with an exchangeable filtering bottom 12, the said bottom being placed on an annular shoulder 13. It will be understood that a filtering cup of this type may be used in lieu of any of the filtering cups 2, 3, 4 or 6, 7, 8. By providing the bottom part with a plane bearing surface adapted for engagement with the bearing faces of all the cups of the set, the said bearing faces can be accurately manufactured or ground at low cost.

While in describing the invention reference has been made to particular examples embodying the same, we wish it to be understood that our invention is not limited to the constructions shown in the drawing. For example, we do not limit ourselves to the construction of the cups provided with annular bearing planes, and that in some cases the said bearing faces are in the form of annular edges formed by beveled side walls.

We claim:

1. A filtering apparatus, comprising a bottom part having a plane bearing surface, and a filtering cup having a diameter larger than the outer diameter of said bearing surface and formed with a filtering bottom and with a flange tapering from the margin of said filtering bottom downwardly and inwardly and having at its bottom a bearing face the outer diameter of which is not larger than the outer diameter of the bearing surface of said bottom part and the inner diameter of which is smaller than the diameter of said filtering bottom.

2. A filtering apparatus, comprising a bottom part having a plane marginal bearing surface, a raised rim surrounding said bearing surface, and a tubular portion projecting downwardly from said bearing surface, a filtering cup having a filtering bottom and larger in outer diameter than the inner diameter of said raised rim and formed with a marginal flange tapering downwardly and inwardly and having its bottom part smaller in outer diameter than the inner diameter of said raised rim.

3. A filtering apparatus, comprising a bottom part having a bearing surface of large diameter and considerable area and adapted to be used in connection with any one of a set of filtering cups of different diameters and formed with bearing faces adapted for engagement with the bearing surface of the bottom part.

4. A filtering apparatus, comprising a bottom part having a bearing surface of large diameter and considerable area and adapted to be used in connection with any one of a set of filtering cups of different diameters and formed at their bottoms with marginal bearing faces, the outer diameter of said bearing surface of the bottom part being at least equal to the outer diameter of the largest cup of the set, and the inner diameter of said bearing surface of the bottom part being smaller than the outer diameter of the smallest cup of the set.

5. A filtering apparatus, comprising a bottom part having a bearing surface of large diameter and considerable area and formed with an upwardly directed outer rim and adapted to be used in connection with any one of a set of filtering cups of different diameters and formed with a filtering bottom and marginal rims projecting downwardly from said bottom and providing bearing faces adapted for engagement with the bearing surface of the bottom part.

6. A filtering apparatus, comprising a bottom part having a bearing surface of large diameter and considerable area, adapted to be used in connection with any one of a set of filtering cups of different diameters formed with filtering bottoms and marginal rims projecting downwardly from said bottoms and providing bearing faces adapted for engagement with the bearing surface of the bottom part, the outer diameter of said bearing surface of the bottom part being at least equal to the outer diameter of the bearing face of the largest cup of the set, and the inner diameter of said bearing surface of the bottom part being smaller than the outer diameter of the bearing face of the smallest cup of the set.

In testimony whereof we hereunto affix our signatures.

ALFRED KÖNIG.
GERHARD MÜLLER.